United States Patent
Chan

(10) Patent No.: US 9,235,015 B2
(45) Date of Patent: Jan. 12, 2016

(54) HEAT DISSIPATION DEVICE AND METHOD FOR USE IN AN OPTICAL COMMUNICATIONS MODULE

(71) Applicant: Avago Technologies General IP (Singapore) Pte. Ltd., Singapore (SG)

(72) Inventor: Seng-Kum Chan, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 345 days.

(21) Appl. No.: 13/777,160

(22) Filed: Feb. 26, 2013

(65) Prior Publication Data

US 2014/0241673 A1 Aug. 28, 2014

(51) Int. Cl.
*G02B 6/36* (2006.01)
*G02B 6/42* (2006.01)

(52) U.S. Cl.
CPC .............. *G02B 6/4268* (2013.01); *G02B 6/425* (2013.01); *G02B 6/4269* (2013.01)

(58) Field of Classification Search
CPC ... G02B 6/4268; G02B 6/4269; G02B 6/4272
See application file for complete search history.

(56) References Cited

U.S. PATENT DOCUMENTS

| 6,188,131 | B1 | 2/2001 | Nereng et al. |
| 7,737,550 | B2 | 6/2010 | MacQuarrie et al. |
| 2009/0161311 | A1 | 6/2009 | Tseng |
| 2010/0050658 | A1 | 3/2010 | Ali |
| 2010/0266236 | A1 * | 10/2010 | Meadowcroft et al. ......... 385/14 |
| 2011/0268397 | A1 * | 11/2011 | Meadowcroft et al. ......... 385/94 |

FOREIGN PATENT DOCUMENTS

WO 9418707 A1 8/1994

* cited by examiner

*Primary Examiner* — Uyen Chau N Le
*Assistant Examiner* — Chad Smith

(57) ABSTRACT

A heat dissipation system and method are embodied in an optical subassembly (OSA) that mechanically couples with an electrical subassembly (ESA) of an optical communications module. When the OSA is coupled with the ESA, a heat dissipation block that is embedded in the OSA is spaced apart from components of the ESA by a small air gap. At least a portion of the heat that is generated by one or more of these components passes into the heat dissipation block, which extends through top and bottom surfaces of the OSA. Because the heat dissipation block never makes physical contact with the ESA or with components of the ESA, there is no risk of the block damaging the ESA or detrimentally affecting the electrical performance of the module.

26 Claims, 7 Drawing Sheets

HEAT DISSIPATION DEVICE AND METHOD FOR USE IN AN OPTICAL COMMUNICATIONS MODULE

TECHNICAL FIELD OF THE INVENTION

The invention relates to optical communications modules. More particularly, the invention relates to a heat dissipation device and method for use in an optical communications module such as a parallel optical transmitter, receiver or transceiver module.

BACKGROUND OF THE INVENTION

A variety of parallel optical communications modules exist for simultaneously transmitting and/or receiving multiple optical data signals over multiple respective optical data channels. Parallel optical transmitters have multiple optical transmit channels for transmitting multiple respective optical data signals simultaneously over multiple respective optical waveguides (e.g., optical fibers). Parallel optical receivers have multiple optical receive channels for receiving multiple respective optical data signals simultaneously over multiple respective optical waveguides. Parallel optical transceivers have multiple optical transmit and receive channels for transmitting and receiving multiple respective optical transmit and receive data signals simultaneously over multiple respective transmit and receive optical waveguides.

For each of these different types of parallel optical communications modules, a variety of designs and configurations exist. A typical layout for a parallel optical communications module includes an electrical subassembly (ESA) comprising a circuit board, such as a printed circuit board (PCB) with a ball grid array (BGA), and various electrical and optoelectronic components mounted on the upper surface of the circuit board, and an optical subassembly (OSA) comprising optical elements (e.g., refractive, reflective or diffractive lenses) mechanically coupled to the ESA. In the case of a parallel optical transmitter, laser diodes and one or more laser diode driver integrated circuits (ICs) are mounted on the circuit board. The circuit board has electrical conductors running through it (i.e., electrical traces and vias) and electrical contact pads on it. The electrical contact pads of the laser diode driver IC(s) are electrically connected to the electrical conductors of the circuit board. One or more other electrical components, such as a controller IC, for example, are typically also mounted on and electrically connected to the circuit board.

Similar configurations are used for parallel optical receivers, except that the circuit board of the parallel optical receiver has a plurality of photodiodes instead of laser diodes mounted on it and a receiver IC instead of a laser diode driver IC mounted on it. Parallel optical transceivers typically have laser diodes, photodiodes, one or more laser diode driver ICs, and a receiver IC mounted on it, although one or more of these devices may be integrated into the same IC to reduce part count and to provide other benefits.

The circuit board typically has one or more heat sink devices mounted on the upper surface thereof. The heat sink devices can have various shapes. The electrical and optoelectronic components are typically attached by a thermally conductive material to these heat sink devices to enable heat generated by them to pass down into the heat sink devices where the heat is dissipated or removed by some other means through the bottom of the circuit board. Heat sink devices all have the same general purpose of receiving heat generated by the respective components and absorbing and/or spreading out the heat to move it away from the components. Heat generated by the components can detrimentally affect the performance and life span of the parallel optical communications module.

In some designs, it is impossible or impractical to remove heat through the bottom of the circuit board. For example, with BGAs, the array of electrically-conductive balls on the bottom of the BGA are in contact with an array of electrical contacts of an external device, such as a mother circuit board. Because of these electrical connections, there may not be room for a heat dissipation path down through the bottom of the BGA. In such cases, it is known to remove heat through the top of the module by attaching an external heat dissipation device to the top of the module. In some cases, heat is dissipated through both the bottom of the circuit board and through the top of the module.

In some parallel optical communications modules, the upper surface of the circuit board is mechanically very fragile and electrically sensitive. In such cases, placing an external heat dissipation device in contact with the upper surface of the circuit board may damage the circuit board and/or detrimentally affect the electrical performance of the module. For example, the mechanical force exerted by the heat dissipation device may crack or warp the circuit board and/or damage the electrical traces of the circuit board, whereas the contact between the heat dissipation device and the circuit board may change the capacitance of the electrical traces leading to electrical performance problems.

Accordingly, a need exists for methods and systems that provide improvements in heat dissipation and that allow heat to be dissipated through the top of a parallel optical communications module without potentially damaging the circuit board or detrimentally affecting the performance of the module.

SUMMARY OF THE INVENTION

The invention provides methods and systems for use in an optical communications module for dissipating heat. The optical communications module comprises an ESA, an OSA mechanically coupled with the ESA, and a heat dissipation block disposed in the void formed in the OSA. The ESA comprises a first circuit board having at least a top surface and a bottom surface, at least a first electrical component mounted on the upper surface of the first circuit board, and at least a first optoelectronic component mounted on the upper surface of the first circuit board. At least one of the first electrical component and the first optoelectronic component constitutes at least a first heat source. The OSA comprises a plurality of optical elements for optically coupling optical signals between an end of at least one optical fiber of the optical communications module and the first optoelectronic device. The heat dissipation block disposed in the void of the OSA comprises a material of high thermal conductivity and has at least a top surface and a bottom surface. The top surface of the heat dissipation block is generally in a plane that is substantially parallel to a plane in which the top surface of the OSA generally lies. The bottom surface of the heat dissipation block is generally in a plane that is substantially parallel to the bottom surface of the OSA. The bottom surface of the heat dissipation block is spaced apart from a top surface of the first heat source by a small air gap. Because of the close proximity of the bottom surface of the heat dissipation block to the top surface of the first heat source, at least a portion of heat generated by the first heat source crosses the air gap and passes into the heat dissipation block.

The method comprises mechanically coupling an OSA of an optical communications module with an ESA of the optical communications module, where the OSA has a void formed therein that extends through top and bottom surfaces of the OSA. The void has a heat dissipation block disposed therein and fixedly secured to the OSA. The ESA comprises a first circuit board having at least a top surface and a bottom surface, at least a first electrical component mounted on the top surface of the first circuit board, and at least a first optoelectronic component mounted on the top surface of the first circuit board, where at least one of the first electrical component and the first optoelectronic component constitutes at least a first heat source. The heat dissipation block comprises a material of high thermal conductivity and has at least a top surface and a bottom surface. The top surface of the heat dissipation block generally lies in a plane that is substantially parallel to a plane in which the top surface of the OSA generally lies. The bottom surface of the heat dissipation block generally lies in a plane that is substantially parallel to the bottom surface of the OSA. The bottom surface of the heat dissipation block is spaced apart from a top surface of the first heat source by a small air gap such that at least a portion of heat generated by the first heat source crosses the air gap and passes into the heat dissipation block.

These and other features and advantages of the invention will become apparent from the following description, drawings and claims.

DETAILED DESCRIPTION OF AN ILLUSTRATIVE EMBODIMENT

In accordance with the invention, a heat dissipation system and method are provided that allow heat to be dissipated through the top of a parallel optical communications module without the possibility of damaging the circuit board or detrimentally affecting the electrical performance of the module. The heat dissipation system and method are embodied in an OSA that mechanically couples with a circuit board of an ESA of the module. When the OSA is mechanically coupled with the ESA, a heat dissipation block that is embedded in the OSA comes into very close proximity with, but does not come into physical contact with, one or more electrical and/or optoelectronic components that are mounted on the top surface of the circuit board. A bottom surface of the heat dissipation block is spaced apart from a top surface of at least one heat source of the ESA by a small air gap. At least a portion of the heat that is generated by one or more of these components moves along a thermal path that passes through the air gap and into the heat dissipation block. A top surface of the heat dissipation block is exposed through an opening formed in a top surface of the OSA. An external heat dissipation device may be mechanically coupled with the module such that the external heat dissipation device is in direct physical contact with the top surface of the heat dissipation block. In this way, heat that passes into the heat dissipation block then passes into the external heat dissipation device where it is dissipated.

Because the heat dissipation block never makes physical contact with the circuit board of the ESA or with the electrical and/or optoelectronic components mounted on the circuit board, heat is dissipated through the top of the parallel optical communications module without the risk of damaging the circuit board or detrimentally affecting the electrical performance of the module. Illustrative, or exemplary, embodiments of the heat dissipation system and method will now be described with reference to FIGS. 1-6, in which like reference numbers represent like elements, features or components.

Figure 1A:
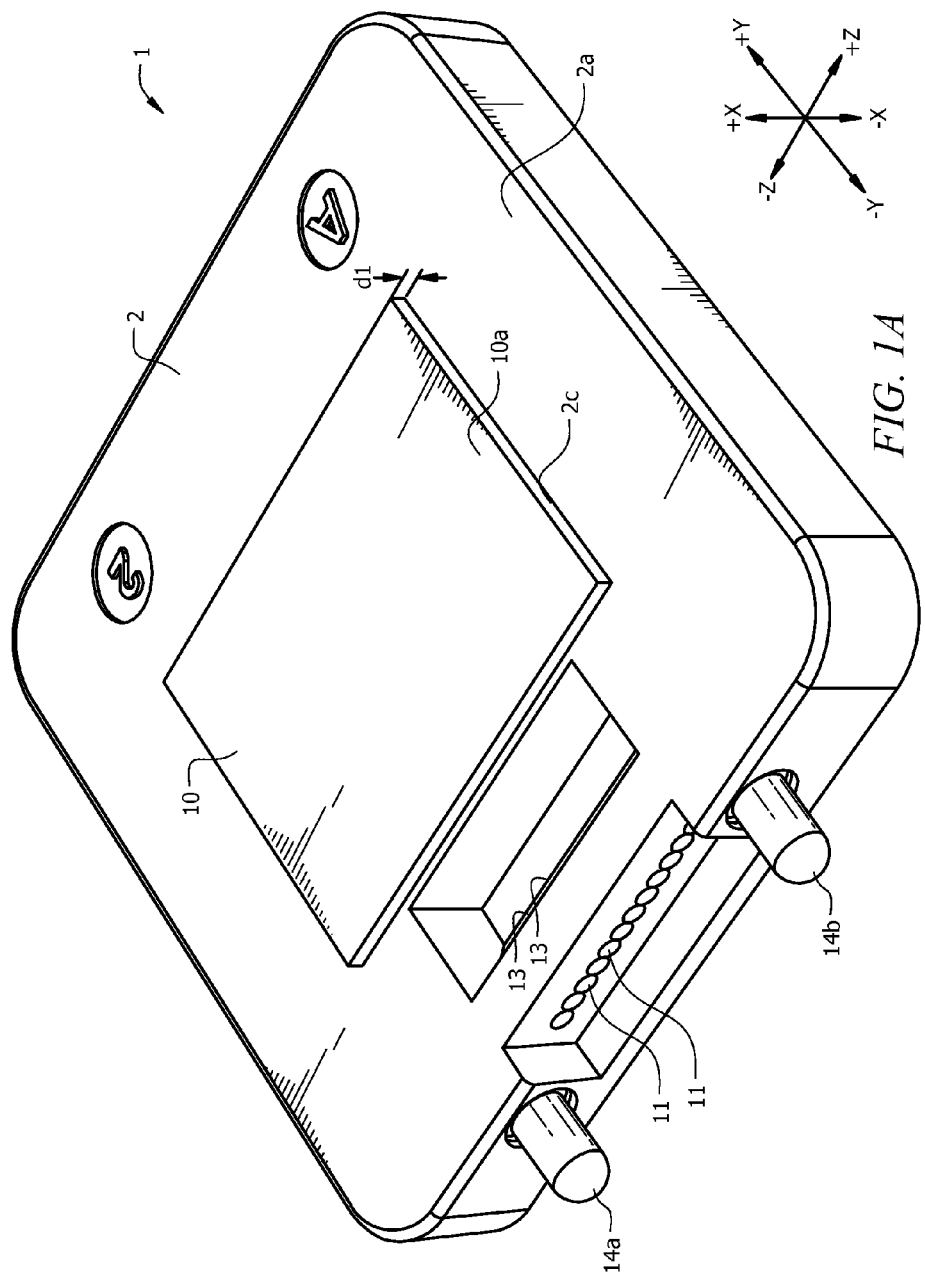
FIGS. 1A and 1B illustrate top and bottom perspective views, respectively, of an OSA in accordance with an illustrative having an OSA body in which a heat dissipation block is embedded.
Figure 1B:
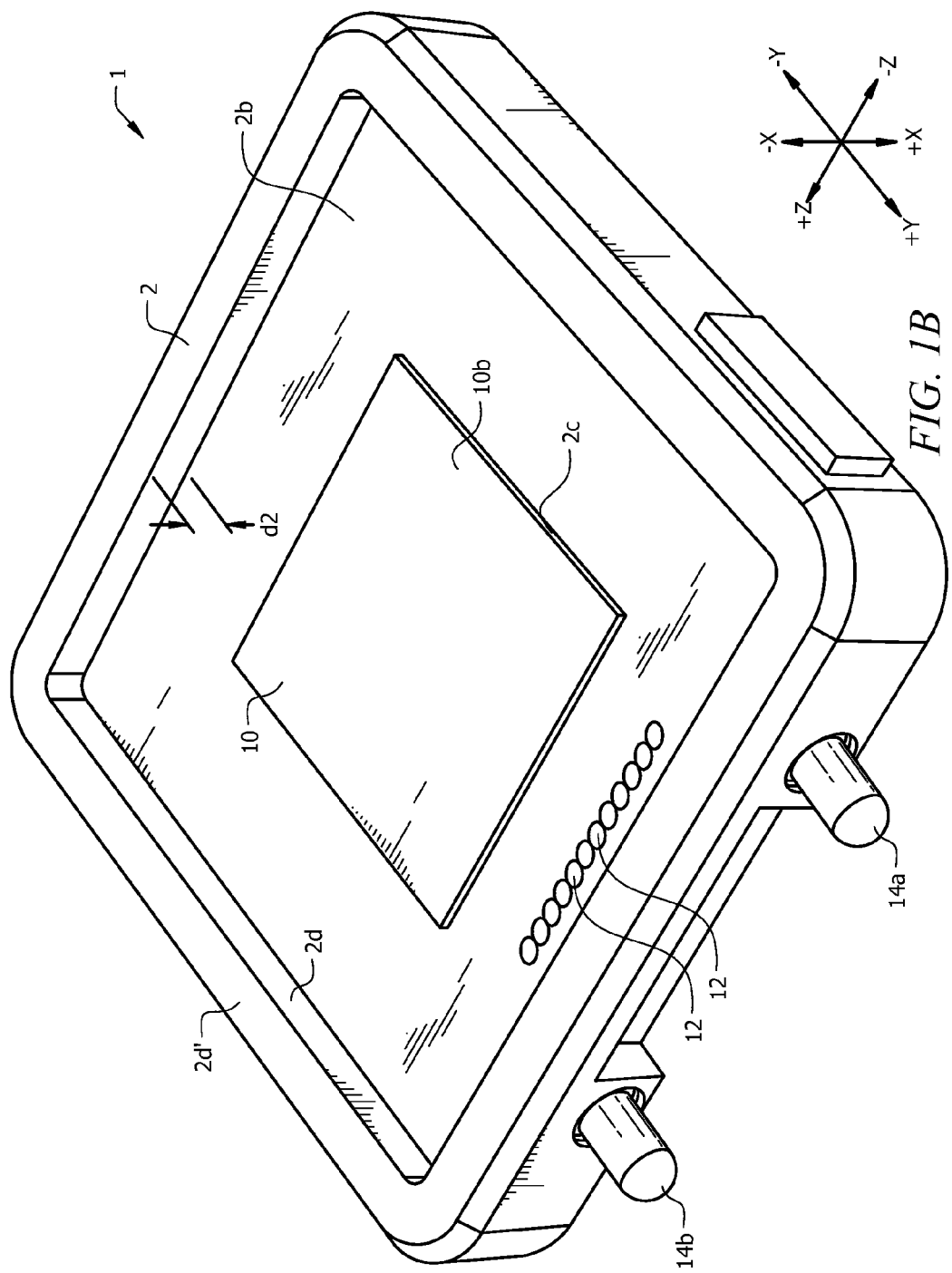
Figure 2:
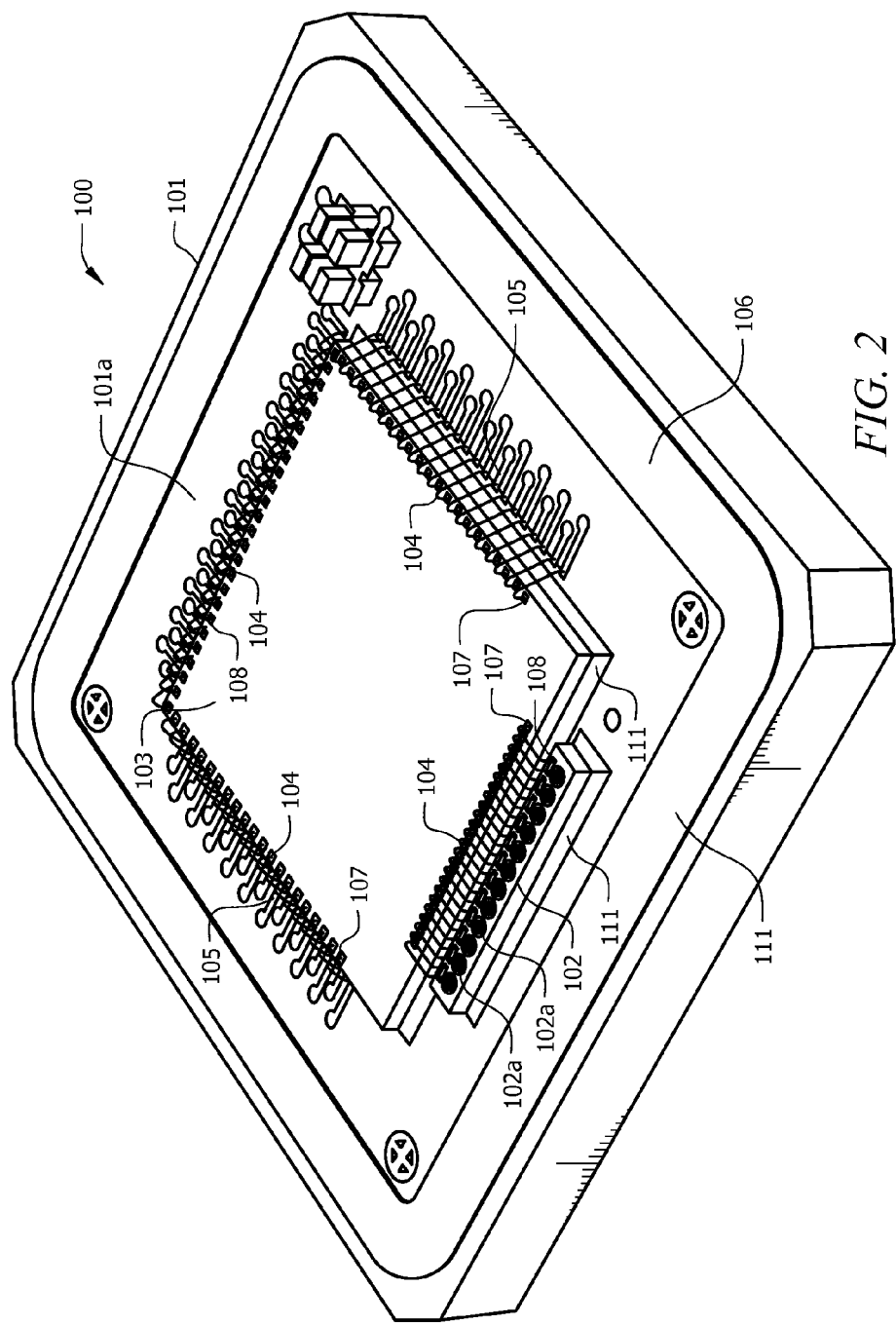
FIG. 2 illustrates a top perspective view of an ESA designed to be mechanically coupled with the OSA shown in FIGS. 1A and 1B.
Figure 3:
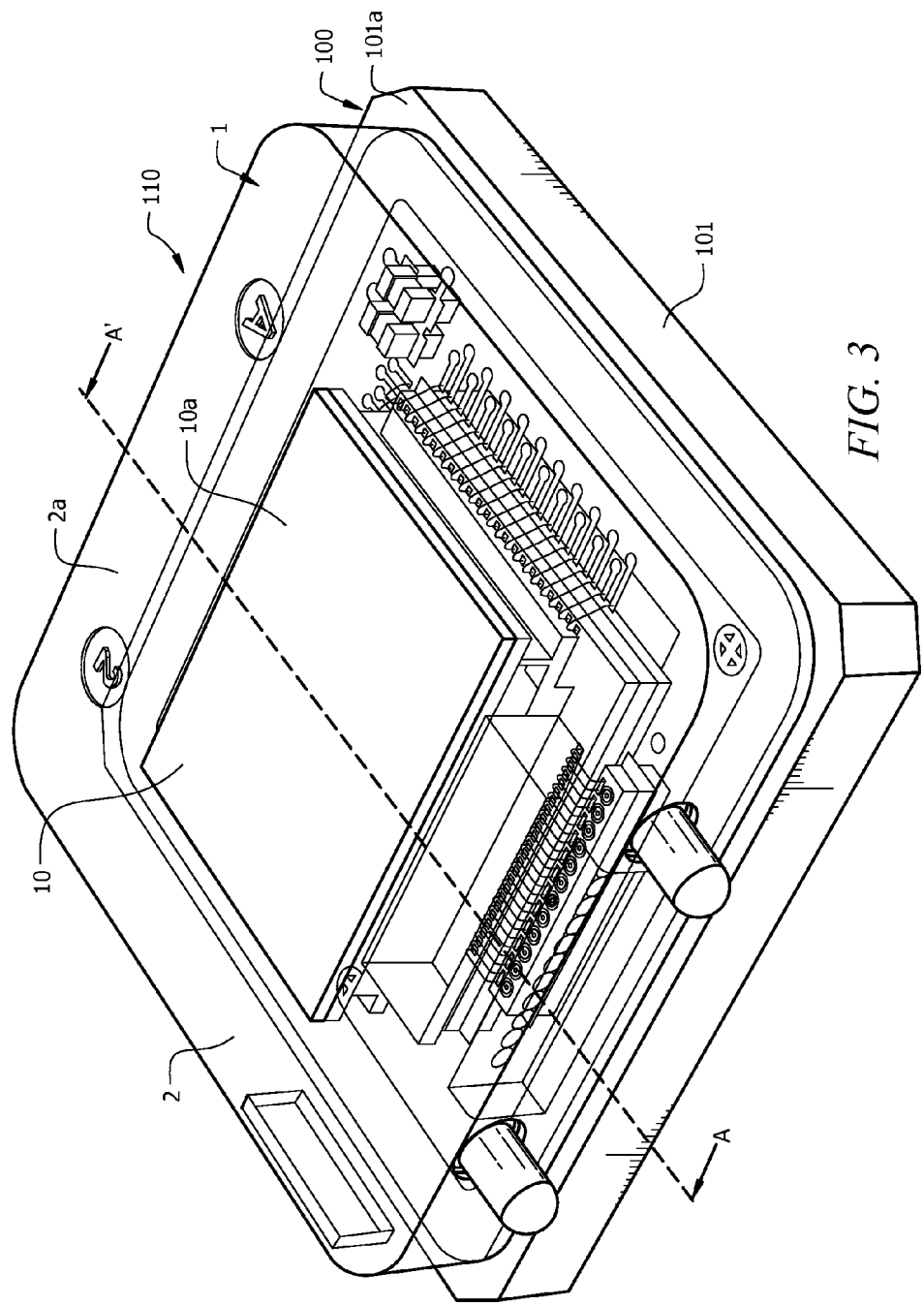
FIG. 3 illustrates a top perspective view of a parallel optical communications module comprising the OSA shown in FIGS. 1A and 1B and the ESA shown in FIG. 2, with the ESA and the OSA shown mechanically coupled together.
Figure 4:
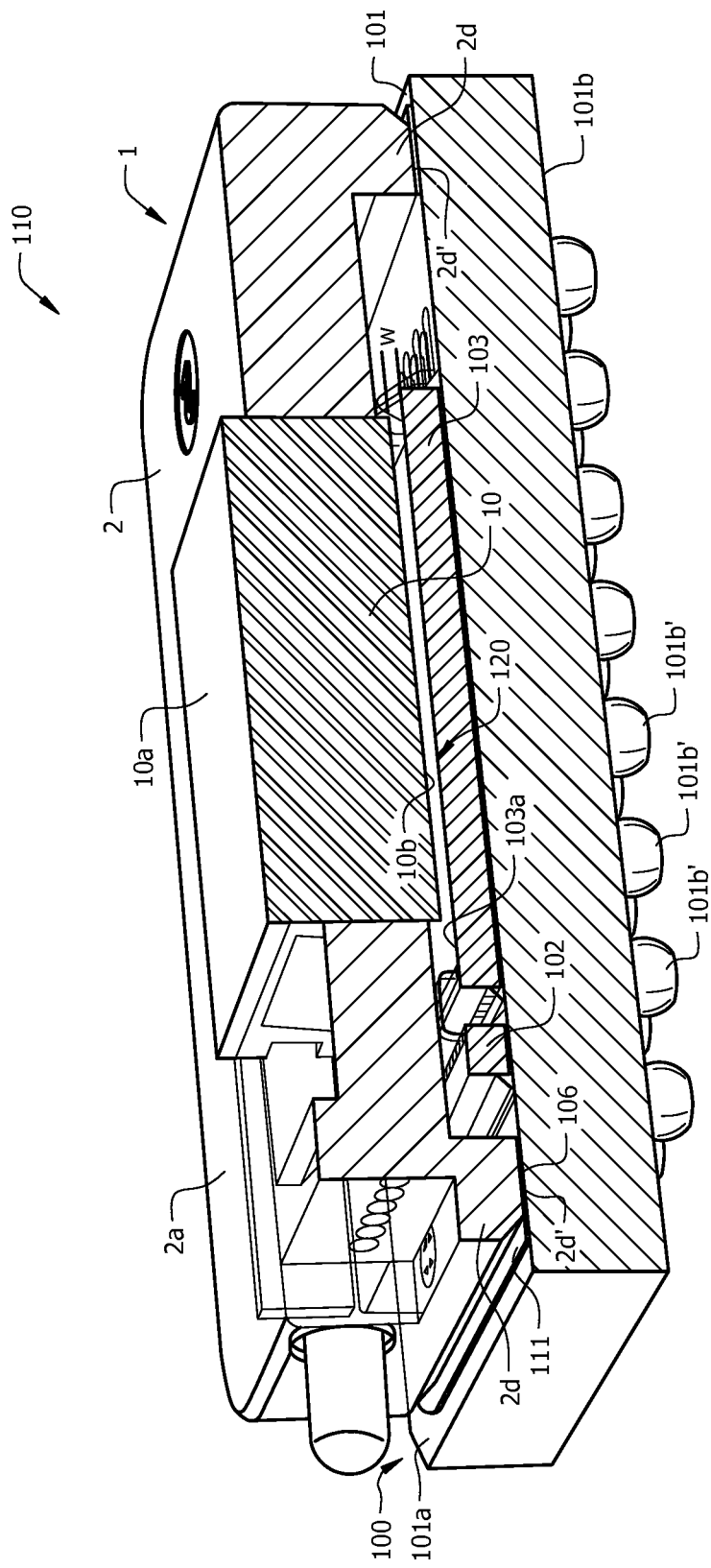
FIG. 4 illustrates a cross-sectional perspective view of the parallel optical communications module shown in FIG. 3 taken along line A-A'.
Figure 5:
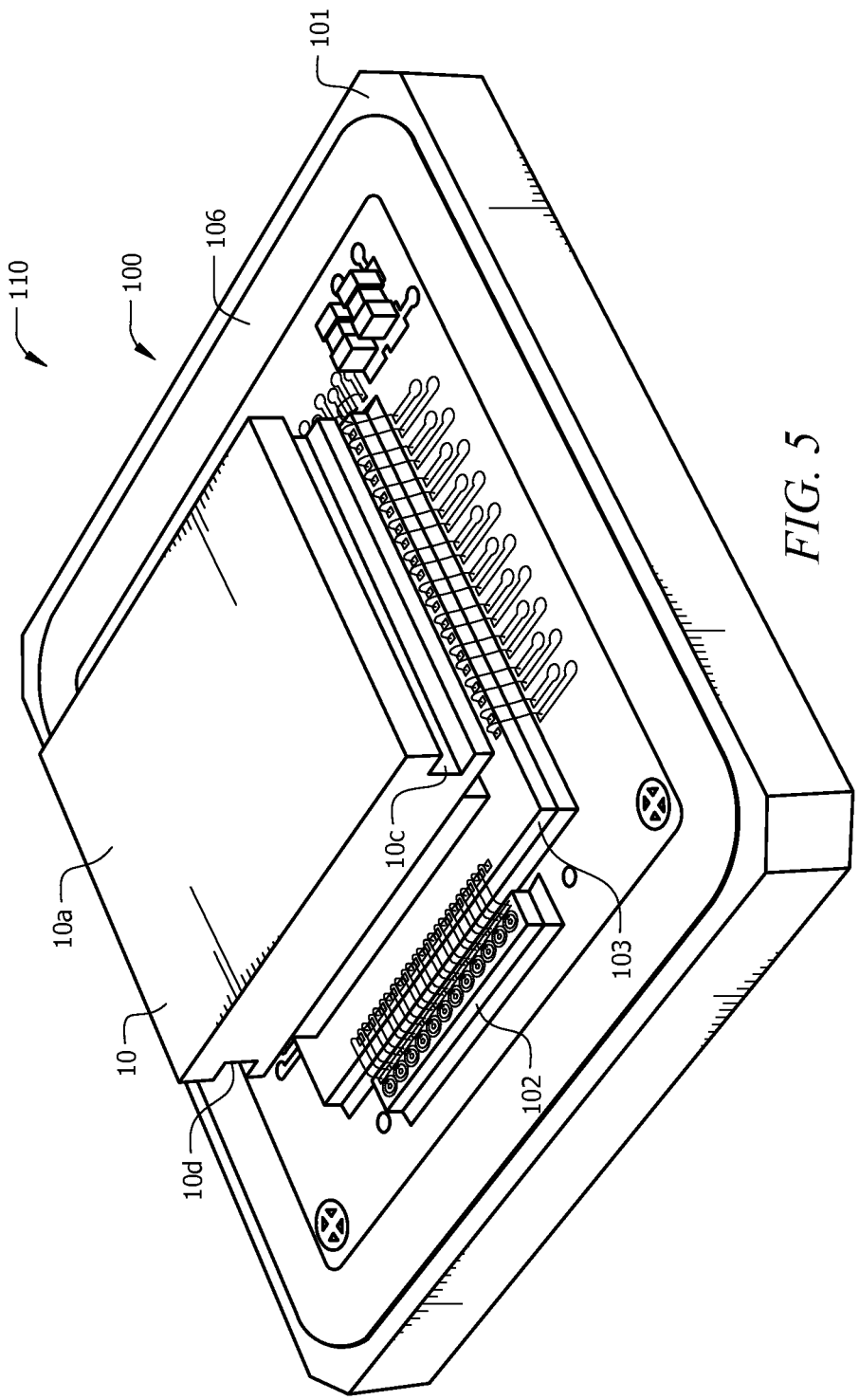
FIG. 5 illustrates a perspective view of the parallel optical communications module shown in FIG. 3 with the OSA body hidden, but with the heat dissipation block shown to illustrate the relationship between the heat dissipation block and components of the ESA.

FIGS. 1A and 1B illustrate top and bottom perspective views, respectively, of an OSA 1 in accordance with an illustrative embodiment having an OSA body 2 in which a heat dissipation block 10 is embedded. FIG. 2 illustrates a top perspective view of an ESA 100 designed to be mechanically coupled with the OSA 1 shown in FIGS. 1A and 1B. FIG. 3 illustrates a top perspective view of a parallel optical communications module 110 comprising the OSA 1 shown in FIGS. 1A and 1B and the ESA 100 shown in FIG. 2, with the ESA 100 and the OSA 1 shown mechanically coupled together. FIG. 4 illustrates a cross-sectional perspective view of the parallel optical communications module 110 shown in FIG. 3 taken along line A-A'. FIG. 5 illustrates a perspective view of the parallel optical communications module 110 shown in FIG. 3 with the OSA body 2 hidden to demonstrate the relationship between the heat dissipation block 10 and components of the ESA 100. The heat dissipation system and method will now be described with reference the illustrative embodiment depicted in FIGS. 1A-6.

As shown in FIGS. 1A and 1B, the heat dissipation system is made up of the OSA 1 having the heat dissipation block 10 embedded in the body 2 of the OSA 1. The heat dissipation block 10 is made of a material of high thermal conductivity, such as copper, for example. The heat dissipation block 10 is not limited to being made of any particular material except that the material of which it is made will have a relatively high thermal conductivity. The heat dissipation block 10 has a top surface 10a (FIG. 1A) and a bottom surface 10b (FIG. 1B). The top surface 10a is a small distance, d1, away from the top surface 2a of the OSA body 2 in the positive X-direction of the X-Y, Z Cartesian coordinate system shown in FIG. 1A. The bottom surface 10b of the heat dissipation block 10 may be a small distance away from the bottom surface 2b of the OSA body 2 in the negative X-direction of the X-Y, Z Cartesian coordinate system, but could instead be flush with the bottom surface 2b of the OSA body 2. The heat dissipation block 410 is disposed in a void, or opening, 2c formed in the OSA body 2. A peripheral portion 2d of the OSA body 2 constitutes a ridge having a lower surface 2d' that is a small distance, d2, away from the bottom surface 2b of the OSA body 2 in the negative X-direction of the X-Y, Z Cartesian coordinate system.

The OSA body 2 has a plurality of a first set of refractive optical elements 11 (FIG. 1A), a second set of refractive optical elements 12 (FIG. 1B), and a first set of reflective optical elements 13 (FIG. 1A) formed therein. The OSA body has first and second male mating features 14a and 14b thereon for mating with first and second female mating features (not shown), respectively, of an optical connector module (not shown) that mates with the OSA body 2. When the optical connector module (not shown) is mated with the OSA body 2, ends of optical fibers (not shown) held in the optical connector are brought into optical alignment with respective refractive optical elements 11. Respective refractive optical elements 11 and 12 and respective reflective optical elements 13 work together to provide respective optical pathways between the ends of the respective optical fibers and respective vertical cavity surface emitting laser diodes (VCSELs) 102a (FIG. 2) of a VCSEL array 102 of the ESA 100 (FIG. 2). In accordance with this illustrative embodiment, the reflective optical elements 13 are 45° mirrors that fold the respective optical pathways by an angle of 90°. In accordance with this illustrative embodiment, the VCSEL array 102 has twelve VCSELs, and thus the parallel optical communications module 110 (FIG. 3) is a twelve-channel parallel optical transmitter module.

With reference to FIG. 2, the ESA 100 includes a circuit board 101, the VCSEL array 102, a first IC 103, bond wires 104, contact pads 105, and an epoxy flow region 106. In accordance with this illustrative embodiment, the first IC 103 is both a module controller and a laser diode driver. Some of the bond wires 104 electrically interconnect contact pads 107 of the IC 103 with contact pads 105 of the circuit board 101, while some of the bond wires 104 electrically interconnect contact pads 107 of the IC 103 with contact pads 108 of the VCSEL array 102. The VCSEL array 102 and the IC 103 are attached to a top surface 101a of the circuit board 101 by epoxy 111.

With reference to FIGS. 2 and 3, when the OSA 1 is aligned with and mounted on the top surface 101a of the circuit board 101, the bottom surface 2d' of ridge 2d (FIG. 1B) of the OSA body 2 comes into contact with the epoxy flow region 106 (FIG. 2) disposed on the top surface 101a of the circuit board 101. The epoxy flow region 106 has epoxy 111 on it that, once cured, fixedly secures the OSA body 2 to the circuit board 101.

With reference to FIG. 4, in accordance with this illustrative embodiment the circuit board 101 is a BGA having an array of solder balls 101b' disposed on its lower surface 101b for electrically interconnecting the BGA with an external mother circuit board (not shown for purposes of clarity). It can be seen that the bottom surface 10b of the heat dissipation block 10 is spaced apart from the top surface 103a of the IC 103 such that a small air gap 120 exists between the bottom surface 10b of the heat dissipation block 10 and the top surface 103a of the IC 103.

It can also been seen in FIG. 4 that the only portion of the OSA body 2 that is in physical contact with the circuit board 101 is the bottom surface 2d' of the ridge 2d. The bottom surface 2d' of the ridge 2d is fixedly secured by epoxy 111 to the top surface 101a of the circuit board 101 in the epoxy flow region 106. Because of the distance d2 (FIG. 1B) between the bottom surface 2d' of the ridge 2d and the bottom surface 2b of the OSA body 2, the OSA body 2 does not come into physical contact with the VCSEL array 102, the IC 103, the bond wires 104, or any parts of the circuit board 101 other than the epoxy flow region 106. Therefore, the risks of damaging the circuit board 101 or detrimentally affecting the electrical performance of the module 110 are avoided. The width, w, of the air gap 120 is not limited to being any particular width. In accordance with this illustrative embodiment, the width of the air gap 120 is in a range of from about 80 micrometers to about 200 micrometers, and typically is about 150 micrometers. The air gap 120 is small enough that a significant portion of the heat that is generated by the IC 103 will be conducted by the air gap 120 upwardly into the heat dissipation block 10. As will be described below in more detail with reference to FIG. 6, an external heat dissipation device will typically be mechanically coupled with the module 110 and in direct physical contact with the heat dissipation block 10 for dissipating the heat that passes into the block 10.

With reference to FIG. 5, it can be seen that, in accordance with this illustrative embodiment, the heat dissipation block 10 has slots 10c and 10d formed in opposite sides thereof. These slots 10c and 10d facilitate fixedly securing the block 10 to the OSA body 2, as will now be described with reference to FIG. 5. The heat dissipation block 10 is typically secured to the OSA body 2 by a plastic over-molding process during which the block 10 is positioned inside of a mold (not shown) having a shape that is the complement of the shape that the OSA body 2 is intended to have. Plastic is then injected into the mold. When the plastic is injected into the mold, the plastic surrounds all sides of the block 10 and fills the slots 10c and 10d. When the plastic cools and hardens, the hardened plastic that is within the slots 10c and 10d interlocks the block 10 with the molded plastic OSA body 2 and prevents the block 10 from moving relative to the molded plastic OSA body 2.

Figure 6:
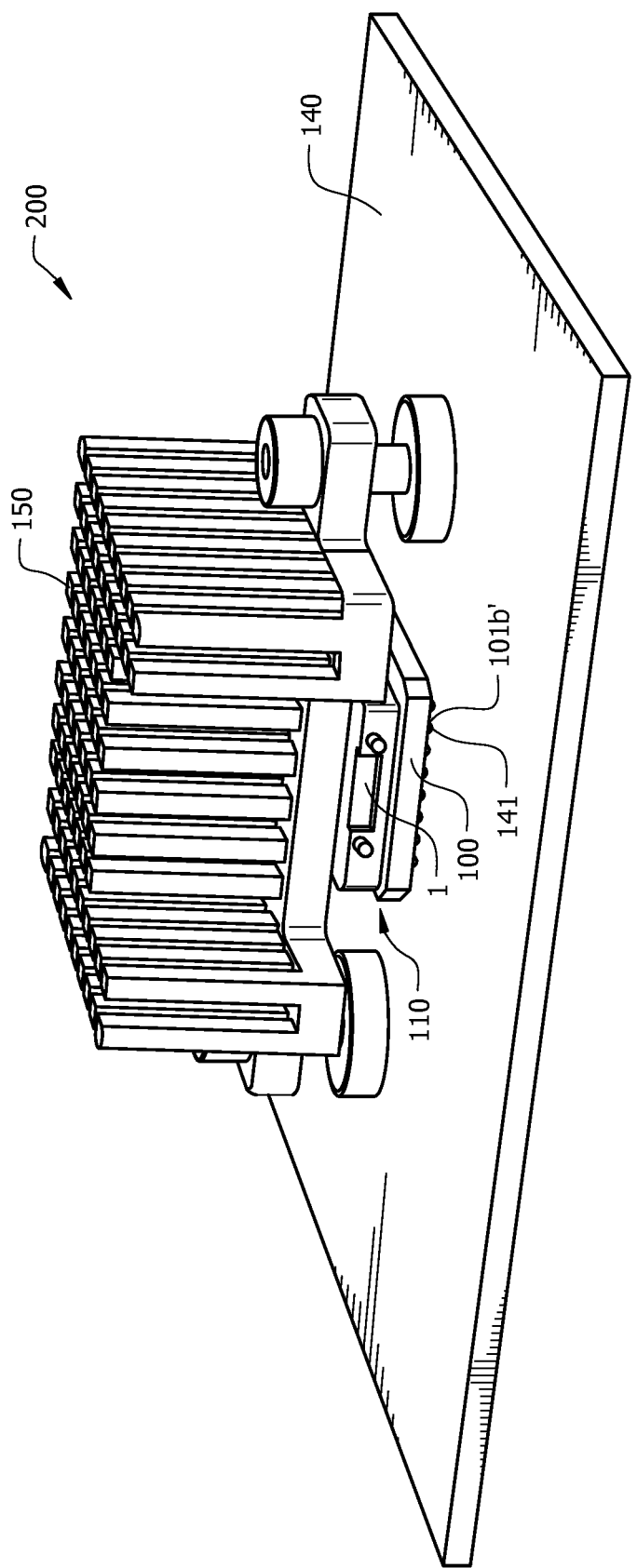
FIG. 6 illustrates a top perspective view of the parallel optical communications module shown in FIG. 3 mechanically coupled with an external heat dissipation device that is in physical contact with the top surface of the heat dissipation block shown in FIG. 1A.

FIG. 6 illustrates a top perspective view of the parallel optical communications module 110 shown in FIG. 3 mounted on an external circuit board 140 and mechanically coupled with an external heat dissipation device 150. The solder balls 101b' disposed on the bottom surface 101b of the module circuit board 101 (FIG. 4) are in contact with respective electrical contacts 141 disposed on the top surface of the external circuit board 140. The top surface 10a (FIG. 1A) of the heat dissipation block 10 (FIG. 1A) is in direct contact with a bottom surface of the external heat dissipation device 150. Through this direct contact, heat that passes from the IC 3 across the air gap 120 (FIG. 4) into the heat dissipation block 10 is then conducted into the external heat dissipation device 150 where it is dissipated.

It should be noted that the invention has been described with respect to illustrative embodiments for the purpose of describing the principles and concepts of the invention. The invention is not limited to these embodiments. For example, while the invention has been described with reference to the heat dissipation block 10 having a particular shape and being positioned over a particular component 103 of the ESA 100 that constitutes a heat source, the invention is not limited with respect to the shape of the block 10 or with respect to the components of the ESA 100 from which the block 10 removes heat. Also, while the invention has been described with reference to its use in a parallel optical transmitter module, the invention may be used in any optical communications module. The invention has been described with reference to a parallel optical communications module due to the fact that the increased number of channels and components leads to more stringent heat dissipation requirements. As will be understood by those skilled in the art in view of the description being provided herein, many modifications may be made to the embodiments described herein while still achieving the goals of the invention, and all such modifications are within the scope of the invention.

What is claimed is:

1. An optical communications module comprising:
    an electrical subassembly (ESA) comprising a first circuit board having at least an upper surface and a bottom surface, at least a first electrical component mounted on the upper surface of the first circuit board, and at least a first optoelectronic component mounted on the upper surface of the first circuit board, wherein at least one of the first electrical component and the first optoelectronic component constitutes at least a first heat source;
    an optical subassembly (OSA), the OSA comprising a plurality of optical elements for optically coupling optical signals between an end of at least one optical fiber of the optical communications module and the first optoelectronic device, the OSA having at least a top surface and a bottom surface with a ridge formed on a peripheral portion of the bottom surface extending away from the bottom surface, wherein a bottom surface of the ridge contacts the upper surface of the first circuit board of the ESA to mechanically couple the OSA with the ESA, the OSA also having a void formed therein that extends through the top and bottom surfaces of the OSA; and
    a heat dissipation block disposed in the void of the OSA, the heat dissipation block comprising a material of high thermal conductivity and having at least a top surface and a bottom surface, wherein the ridge on the bottom surface of the OSA is dimensioned to hold the bottom surface of the heat dissipation block spaced apart from a top surface of the first heat source by a predetermined distance to form an air gap.

2. The optical communications module of claim 1, wherein the air gap has a width, w, corresponding to a distance between the top surface of the first heat source and the bottom surface of the heat dissipation block, and wherein the width w ranges from about 80 micrometers to about 200 micrometers.

3. The optical communications module of claim 2, wherein the width is about 150 micrometers.

4. The optical communications module of claim 1, wherein the optical communications module is a parallel optical communications module, and wherein the first electrical component is a first integrated circuit (IC) device and wherein the first optoelectronic component is an array of optoelectronic elements.

5. The optical communications module of claim 1, wherein the heat dissipation block is made of copper.

6. The optical communications module of claim 1, wherein the plane in which the top surface of the heat dissipation block generally lies is a first Y-Z plane of an X, Y, Z Cartesian coordinate system, and wherein the plane in which the top surface of the OSA generally lies is a second Y-Z plane of the X, Y, Z Cartesian coordinate system, the first and second Y-Z planes being parallel to one another.

7. The optical communications module of claim 1, further comprising:
    an external heat dissipation device mechanically coupled with the module such that a bottom surface of the external heat dissipation device is in direct contact with the top surface of the heat dissipation block.

8. The optical communications module of claim 1, wherein the OSA comprises a molded plastic.

9. The optical communications module of claim 1, wherein the upper surface of the first circuit board of the ESA further comprises an epoxy flow region formed on a periphery of the upper surface of the first circuit board such that the bottom surface of the ridge of the OSA contacts the epoxy flow region to mechanically couple the OSA with the ESA.

10. The optical communications module of claim 9, wherein the OSA is mechanically coupled to the ESA by an epoxy.

11. The optical communications module of claim 1, wherein the ridge is dimensioned so as to hold the bottom surface of the OSA apart from the first electrical component and the first optoelectronic component of the ESA.

12. The optical communications module of claim 1, wherein the bottom surface of the ridge of the OSA is the only portion of the OSA in contact with the ESA.

13. The optical communications module of claim 8, wherein the heat dissipation block contains at least two slots formed in opposite side surfaces of the heat dissipation block, the at least two slots of the heat dissipation block configured to engage corresponding sides of the void formed in the OSA to secure the heat dissipation block to the OSA.

14. The optical communications module of claim 13, wherein the OSA is formed by molding the plastic around the heat dissipation block.

15. The optical communications module of claim 4, wherein the first optoelectronic component is a VCSEL array.

16. The optical communications module of claim 15, wherein the plurality of optical elements of the OSA comprises a first set of refractive optical elements and a second set of refractive optical elements.

17. The optical communications module of claim 1, wherein bottom surface of the first circuit board of the ESA contains a plurality of conductors for electrically connecting the optical communications module to a second circuit board.

18. The optical communications module of claim 17, wherein the plurality of conductors comprise a ball grid array.

19. A method for dissipating heat in an optical communications module, the method comprising:
    mechanically coupling an optical subassembly (OSA) of an optical communications module with an electrical subassembly (ESA) of the optical communications module, the OSA having a void formed therein that extends through top and bottom surfaces of the OSA, the void having a heat dissipation block disposed in the void and fixedly secured to the OSA, the OSA further having a ridge formed on a peripheral portion of the bottom surface extending away from the bottom surface, wherein the ESA comprises a first circuit board having at least a top surface and a bottom surface, at least a first electrical component mounted on the top surface of the first circuit board, and at least a first optoelectronic component mounted on the top surface of the first circuit board, wherein at least one of the first electrical component and the first optoelectronic component constitutes at least a first heat source, wherein the heat dissipation block comprises a material of high thermal conductivity and has at least a top surface and a bottom surface, wherein a bottom surface of the ridge contacts the top surface of the first circuit board of the ESA to mechanically couple the OSA with the ESA, the ridge dimensioned to hold the bottom surface of the heat dissipation block spaced apart from a top surface of the first heat source by a predetermined distance to form an air gap, and wherein at least a portion of heat generated by the first heat source crosses the air gap and passes into the heat dissipation block.

20. The method of claim 19, wherein the air gap has a width, w, corresponding to a distance between the top surface of the first heat source and the bottom surface of the heat dissipation block, and wherein the width w ranges from about 80 micrometers to about 200 micrometers.

21. The method of claim 20, wherein the width is about 150 micrometers.

22. The method of claim 19, wherein the optical communications module is a parallel optical communications module, and wherein the first electrical component is a first integrated circuit (IC) device and wherein the first optoelectronic component is an array of optoelectronic elements.

23. The method of claim 19, wherein the heat dissipation block is made of copper.

24. The method of claim 19, wherein the plane in which the top surface of the heat dissipation block generally lies is a first Y-Z plane of an X, Y, Z Cartesian coordinate system, and wherein the plane in which the top surface of the OSA generally lies is a second Y-Z plane of the X, Y, Z Cartesian coordinate system, the first and second Y-Z planes being parallel to one another.

25. The method of claim 19, further comprising:
mechanically coupling an external heat dissipation device with the module such that a bottom surface of the external heat dissipation device is in direct contact with the top surface of the heat dissipation block, and wherein at least a portion of the heat that flows into the heat dissipation block subsequently flows into the external heat dissipation device.

26. The method of claim 19, wherein the OSA comprises a molded plastic.

\* \* \* \* \*